United States Patent [19]

Bodson

[11] 4,145,212
[45] Mar. 20, 1979

[54] PROCESS FOR RECOVERING SILVER AND OPTIONALLY GOLD FROM A SOLID STARTING MATERIAL CONTAINING SAID METALS

[75] Inventor: Fernand J. J. Bodson, Angleur, Belgium

[73] Assignee: Societe des Mines et Fonderies de Zinc de la Vieille Montagne, Angleur, Belgium

[21] Appl. No.: 843,305

[22] Filed: Oct. 18, 1977

[30] Foreign Application Priority Data

Oct. 19, 1976 [BE] Belgium .................................. 645724

[51] Int. Cl.² ............................................ C22B 11/04
[52] U.S. Cl. ................................ 75/118 R; 75/101 R; 75/109; 75/115
[58] Field of Search .................. 75/118, 109, 115, 101

[56] References Cited

U.S. PATENT DOCUMENTS

| 2,304,427 | 12/1942 | Sibley | 75/109 |
| 3,317,313 | 5/1967 | Buggs et al. | 75/118 R |

FOREIGN PATENT DOCUMENTS 129333  11/1959  U.S.S.R. .................................... 75/109

Primary Examiner—M. J. Andrews
Attorney, Agent, or Firm—Sughrue, Rothwell, Mion, Zinn and Macpeak

[57] ABSTRACT

The invention relates to a process for recovering silver and possibly gold contained in a silver and possibly gold bearing solid starting material, in which said metals are present in low proportions, a part thereof being in the form of free sulphides, possibly in mixture with elemental sulphur, in which said starting material is treated with an aqueous solution of thiourea, so as to solubilize the silver and the gold in the form of complexes with the thiourea, and the obtained solution is subjected to a cementation with a metal so as to obtain a cement containing more than about 90% of silver.

15 Claims, 1 Drawing Figure

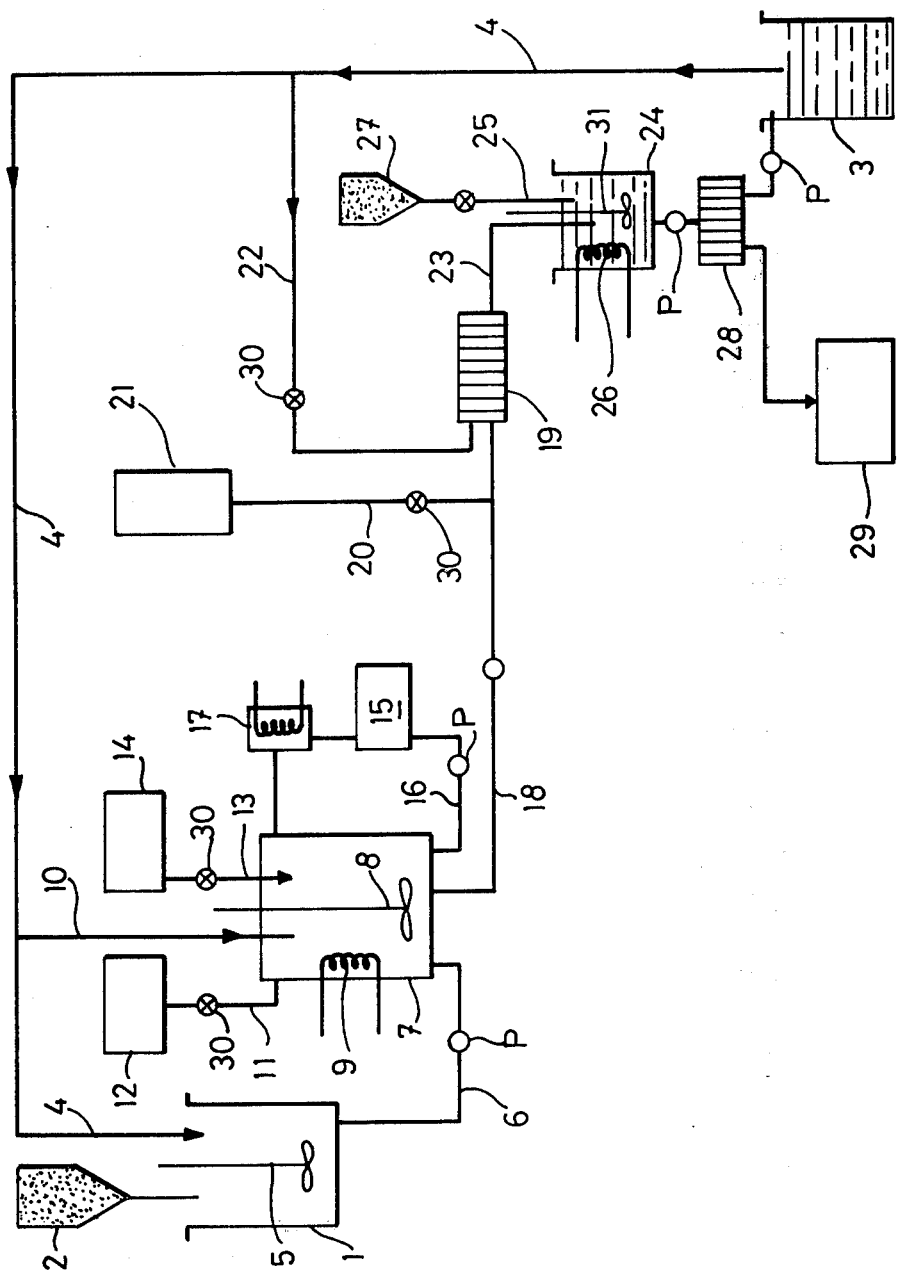

PROCESS FOR RECOVERING SILVER AND OPTIONALLY GOLD FROM A SOLID STARTING MATERIAL CONTAINING SAID METALS

SUBJECT MATTER OF THE INVENTION

The present invention provides a simple and economical process for recovering, in substantially quantitative yield, the silver and the gold contained in silver bearing materials assaying about 1-1.5 of silver.

Such silver bearing materials are for instance, but not exclusively, solid concentrates resulting from the flotation of residues of the lixiviation of zinc ores.

These concentrates frequently contain both silver and gold, although this latter metal is not always present therein in a noticeable amount.

THE PRIOR ART

It is already known that the lixiviation of zinc ores yields residues containing silver, gold, sulphur, lead sulphate and improfitable materials.

There is further also known a process according to which said residues from the lixiviation of zinc ores are subjected to a flotation, using various organic chemical compounds, so as to obtain, among other things, a flotation concentrate containing silver, gold, sulphides and elemental sulphur.

This latter flotation concentrate contains, generally, about 1 to 1.5% of silver in the form of free sulphides or coated with elemental sulphur.

BRIEF DESCRIPTION OF THE INVENTION

The present invention relates to a process for recovering silver and possibly gold contained in a silver and possibly gold bearing solid starting material, in which said metals are present in low proportions, a part thereof being in the form of free sulphides, possibly in mixture with elemental sulphur, said process comprising treating the starting material by means of an aqueous solution of thiourea, so as to render soluble the silver and the gold in the form of complexes with the thiourea, and subjecting the obtained solution to a cementation by means of a metal, so as to obtain a cement containing more than about 90% of silver.

DETAILED DESCRIPTION OF THE INVENTION

According to one specific embodiment of the process of the invention, the solid starting material may be dispersed in an aqueous solution of thiourea, the obtained suspension is acidified to a pH of about 1.5 to 2.5, the acid suspension is heated under constant stirring, the obtained solution is filtered off and the filtrate is subjected to a cementation by means of aluminum.

In order to favour the dissolution of the silver and the gold in the form of complexes with the thiourea, one may, according to a further feature of the invention, add an oxidizing agent to the aqueous suspension of starting material and thiourea. As oxidizing agent, one may use hydrogen peroxide, an organic oxide, a persulphate or ferric chloride. The amount of oxidizing agent to be used must be sufficient to convert into sulphates the proportion of silver and gold sulphides which doesn't form spontaneously a water soluble complex with the thiourea.

The concerned sulphates form more easily a complex with the thiourea than the sulphides.

The preferred oxidizing agent is hydrogen peroxide, which is suitably used in an amount equal to about two times the stoichiometric amount of silver and gold in the form which is not solubilized by the thiourea.

According to another feature of the process of the invention, one may add to the aqueous suspension of starting material and thiourea, an organic solvent of the sulphur. This solvent may be selected from carbon sulphide and the chlorinated olefins, such as perchloroethylene and trichloroethylene. The amount of organic solvent to be used is preferably comprised between about 10 ml and 1000 ml, for each 150 grams of starting silver and gold bearing material. In the case where an organic solvent is added to the suspension of starting silver bearing material in the aqueous solution of thiourea, the obtained mixture is heated to boiling at reflux, preferably for 2 to 4 hours, after which the organic solvent is removed by distillation, from the aqueous phase or solution containing the silver and possibly the gold, solubilized in the form of complexes with the thiourea.

Before filtering the aqueous solution containing the complexes of silver-thiourea and gold-thiourea, it is favourable to add thereto a flocculation agent, such as gelatine or bone-glue, to bring about the flocculation of the various insoluble materials, such as the sulphur and the silica, which are present in the solution of said complexes.

The amount of flocculation agent is suitably comprised between 50 and 200 milligrams of said agent per 150 grams of silver and possibly gold bearing starting material.

The residue of the filtration of the aqueous solution containing the silver and possibly the gold complexes with the thiourea is washed with water or, preferably, by means of an aqueous solution of thiourea, and these washing waters are added to the filtrate before the cementation.

The aqueous solution and the washing waters contain, in a dissolved form, beside the silver and the gold, traces of other elements, such as copper, manganese, lead, cadmium and arsenic.

For the cementation, which constitutes the second essential stage of the process according to the invention, several fractions of aluminum powder are added to the aqueous solution containing the silver and possibly the gold, solubilized in the form of complexes with the thiourea, in a sufficient amount to cementate all the silver and the gold.

The used aluminum is preferably in the form of a powder having particle sizes comprised between about 0.075 and 1.2 millimeters, the purity of said metal being, preferably, from 99 to 99.8%. The total amount of used aluminum is conveniently about 10% by weight with respect to the amount of silver which is present.

The cementation is performed by heating the aqueous silver and possibly gold bearing liquor to a temperature of about 50° to 60° C., for one hour.

The cement of silver, gold and aluminum, which has precipitated, is removed by filtration and the filtrate is recycled, after having readjusted its thiourea content.

The thus obtained cement contains about 90 to 98% of silver, the remainder being gold, copper, aluminum, lead, zinc, silica, etc.

Said cement may, if desired, be converted into an ingot, by melting at a temperature of about 1050° C. under a layer of borax. The ingot of gold containing silver may be refined by known methods, such as by electrorefining.

The only FIGURE of the attached drawing shows schematically an installation for carrying out the process according to the invention.

The installation comprises a first tank 1, in which a silver and gold bearing starting material (such as a flotation concentrate of residues resulting from the lixiviation of zinc ores), issuing from a hopper 2 is mixed to an aqueous solution of thiourea issuing from a storage tank 3 through a pipe 4. Tank 1 is provided with a stirrer 5. The aqueous suspension which is formed in tank 1 is sent through a pipe 6 provided with a pump 10 to a closed chamber 7, provided with a stirrer 8 and heating means schematically indicated in 9.

A supplement of thiourea in aqueous solution may be introduced in this chamber 7 through a pipe 10 which is connected to pipe 4; an oxidizing agent, such as hydrogen peroxide, coming from a feeding tank 12, may be introduced through a pipe 11; and sulphuric acid, coming from a feeding tank 14, may be introduced through a pipe 13.

Further an organic solvent, such as trichloroethylene or carbon sulphide, may be introduced from a storage tank 15 through a pipe 16 and a pump, into the chamber 7.

The trichloroethylene or carbon sulphide vapours emanating from chamber 7 are condensed in an exchanger 17 cooled by means of water. The condensed vapours then run into the storage tank 15, from where they may be returned to the chamber 7.

The aqueous solution of Ag and Au thiourea complexes formed in the chamber 7 are sent through a pipe 18 to a filter-press 19. Up-stream of the inlet of the filter-press 19, an aqueous solution of gelatin, acting as a flocculation agent may be added to said aqueous solution through a pipe 20 connected to pipe 18, said gelatin solution being stored in a feeding tank 21.

The residues of the filtration performed in the filter-press 19 may be washed by means of an aqueous solution of thiourea contained in the storage tank 3, the washing solution being conveyed to the filter-press through a pipe 22 which is connected to pipe 4.

The filtrate issuing from the filter-press 19 through a pipe 23 is sent into a cementation tank 24 provided with a stirrer 31; into this cementation tank 24 further emerges a pipe 25 connected to a storage tank of aluminum powder 27, and this cementation tank 24 is provided with heating means 26.

The cement formed in tank 24 is filtered in a filter-press 28 and recovered in 29, whereas the filtrate is sent to storage tank 3.

In the installation described hereabove the pumps are indicated with the reference notation P and the taps or valves regulating the flow of the solutions or solid products are indicated with the reference numeral 30.

EXAMPLES

The following examples will illustrate the invention.

EXAMPLE 1

225 g of a flotation concentrate of residues resulting from the lixiviation of zinc ores, containing 1.44% of silver, are dispersed in an aqueous solution of 20 g/l of thiourea, so as to obtain a slurry having a volume of 1500 ml. Concentrated sulphuric acid is added to obtain a pH of 2. Under constant stirring the temperature is increased to 85° C. After 3 hours the residue is filtered off. The filtrate has a pH of 2.5. The volume of the filtrate is 1330 ml and contains 1.854 g of Ag/l. The residue is washed with 250 ml of an aqueous solution of 20 g/l of thiourea. One thus obtains a washing water having a volume of 265 ml containing 1.229g of Ag/l. The dried residue has a weight of 224.6 and contains 2600 g of Ag per ton.

| Starting material: | | |
|---|---|---|
| Starting silver: | $225 g \times \frac{1.44}{100} = 3.24g$ | 100% |
| Obtained products: | | |
| Dissolved silver: | $1.330 l \times 1.854 = 2.46g$ | 75.92% |
| Silver in the washing waters: | $0.265 l \times 1.229 = 0.32g$ | 9.87% |
| Silver in the residue: | $224.6 \times \frac{2600}{10^6} = 0.584g$ | 18.02 % |
| Total: | 3.36g | 103.81% |

85.79% of the silver have thus been solubilized.

The solution and the washing water are recovered and combined; one obtains in this way a total volume of 1.495 l of a solution containing 1.763 of silver/l.

To this solution, which has been brought to a temperature of 55° C. one adds 4 times 45mg of aluminium. After one hour the obtained precipitate is filtered off. One recovers 1.575 l of solution containing 49mg/l of silver and a cement weighing 2.832 g and containing 90.5% of silver and 1.1% of aluminum.

The silver balance may thus be expressed as follows:

| Starting material | | |
|---|---|---|
| Dissolved silver: | $1.4951 \times 1.763 = 2.635g$ | 100% |
| Products: | | |
| Dissolved silver: | $1.5751 \times 0.049 = 0.077g$ | 2.92% |
| Precipitate: | $2.832g \times 0.905 = 2.563g$ | 97.26% |
| Total: | = 2.640g | 100.18% |

EXAMPLE 2

225g of a flotation concentrate, containing 1.44% of silver are dispersed in an aqueous solution of 20 g/l of thiourea, so as to obtain a slurry having a volume of 1500 ml.

Concentrated sulphuric acid is added to obtain a pH of 2. Further 100 ml of perchloroethylene are added to the slurry. The temperature is increased to the boiling temperature. After 2 hours of reaction, during which the perchloroethylene is constantly refluxed, the perchloroethylene is distilled off and the solution is filtered.

The volume of the filtrate is 1320 ml; it contains 2.0913 g of silver per liter. The residue is washed with an aqueous solution of 20 g/l of thiourea. The washing waters have a volume of 275 ml and contain 0.668g of silver per liter. The residue weighs 220.3 g and contains 1 710 g Ag/Ton.

The balance of silver may be established as follows:

| Starting material | | |
|---|---|---|
| Starting silver: | $225g \times \frac{1.44}{100} = 3.24g$ | 100% |
| Obtained products | | |
| Dissolved silver: | $1.3201 \times 2.0913 = 2.76g$ | 85.18% |
| Silver in the washing waters: | $0.2751 \times 0.668 = 0.18g$ | 5.55% |
| Silver in the residue: | $220.3g \times \frac{1710}{10^6} = 0.37g$ | 11.41% |
| Total: | = 3.31g | 102.14% |

90.73% of the silver have thus been solubilized.

The solution and the washing water are recovered and combined. One obtains in this way a volume of 1 495 ml of a solution containing 1.876g of silver per liter. This solution is brought to a temperature comprised between 50° C. and 60° C. 280mg of granulated aluminum are added in two times. One recovers 1.5701 of a solution containing 59mg of silver per liter and a cement weighing 2.846 mg and containing 95.5% of silver and 0.14% of aluminum.

The balance may be established as follows:

| Starting material | | |
|---|---|---|
| Dissolved silver: | $1.4951 \times 1.876 = 2.840g$ | 100% |
| Products | | |
| Dissolved silver: | $1.5701 \times 0.059 = 0.092g$ | 3.28% |
| Precipitate: | $2.846 \times \frac{95.5}{100} = 2.718g$ | 96.93% |
| Total: | $= 2.810g$ | 100.2% |

EXAMPLE 3

225g of a flotation concentrate containing 1.44% of silver are dispersed in an aqueous solution of 20 g/l of thiourea so as to obtain a slurry having a volume of 1500 ml.

Concentrated sulphuric acid is added to obtain a pH of 2. Further, one adds 20 ml of $CS_2$. The mixture is brought to the boiling temperature, which is 60° C. During the reaction the $CS_2$ is constantly refluxed. After three hours the pH has increased to 2.5. The $CS_2$ is expelled by distillation and the solution is filtered.

The volume of the filtrate is 1380 ml. It contains 2.09 g of silver per liter. The residue is washed with 250 ml of an aqueous olution of 20 g/l of thiourea. The washing waters have a volume of 250 ml and contain 0.8408 g of silver per liter. The dried residue weighs 221.8 g and contains 850 g of silver/ton.

One may establish the balance as follows:

| Starting material: | | |
|---|---|---|
| Starting silver: | $225g \times \frac{1.44}{100} = 3.24g$ | 100% |
| Obtained products | | |
| Dissolved silver: | $1.380 \text{ l} \times 2.09 = 2.88g$ | 88.88% |
| Silver in the washing waters: | $0.250 \text{ l} \times 0.8408 = 0.21g$ | 6.48% |
| Silver in the residue: | $221.8g \times \frac{850}{10^6} = 0.19g$ | 5.86% |
| Total: | $= 3.28g$ | 101.22% |

95.36% of the silver have thus been solubilized.

The solution and the washing waters are recovered and combined. One obtains in this way a solution having a volume of 1,530 ml and containing 1.926 g of silver per liter.

This solution is heated to a temperature comprised between 50° C. and 60° C. 300 mg of granulated aluminum are then added in four times. After one hour the obtained precipitate is filtered. One recovers 1620 ml of a solution containing 25 mg of silver per liter and a cement weighing 2.984 g, containing 97.5% of silver, 0.17% of aluminum and 1,650 g of gold per ton.

One may establish the balance as follows:

| Starting material | | |
|---|---|---|
| Dissolved silver: | $1.530 \text{ l} \times 1.926 = 2.946 \text{ g}$ | 100% |
| Products: | | |
| Dissolved silver: | $1.620 \times 0.025 = 0.040 \text{ g}$ | 1.3% |
| Precipitate: | $2.984 \times 0.975 = 2.909 \text{ g}$ | 98.7% |
| Total: | $2.949 \text{ g}$ | 100.0% |

EXAMPLE 4

A flotation concentrate weighing 220.5 g and containing 1.44% of silver and 33g of gold/ton is dispersed in 1500 ml of water.

Sulphuric acid is added so as to obtain a pH of 1.7.

One further adds 30g of thiourea as an aqueous solution containing 20g of thiourea per liter.

The temperature of the slurry is brought to 70° C. After one hour the pH has increased to 1.86 and the slurry has a silver content of 1.94 g/liter. 100 ml of trichloroethylene are added, the temperature of the mixture is increased to the boiling temperature which is 73° C. and the mixture is left to react under reflux of the organic compound for 3 hours. After three hours, the pH has a value of 2.45 and the solution contains 2.156 g of silver per liter. The trichloroethylene is then distilled off. After removal of the trichloroethylene, 110 mg of bone glue diluted in water are added to the slurry. One filters and one washes the residues with an aqueous solution of 20g/l of thiourea. The filtrate and the washing waters are collected and one obtains a volume of 2.190 l containing 1.36 g of Ag/l and 2.7 mg/l of gold.

The final residue weighs 188g and still contains 250 g of silver per ton and 5.5 g of gold per ton.

One may establish the ballance for the silver as follows:

| Starting material: | | |
|---|---|---|
| Starting silver: | $220.5g \times \frac{1.44}{100} = 3.17g$ | 100% |
| Products | | |
| Silver in solution: | $2.190 \times 1.36 = 2.98g$ | 94% |
| Silver in the residue: | $188 \times \frac{250}{10^6} = 0.047g$ | 1.48% |
| Total: | $3.027g$ | 95.48% |

For the gold, the balance is the following:

| Starting material | | |
|---|---|---|
| Starting gold: | $220.5 \text{ g} \times \frac{33}{10^6} = 7 \text{ mg}$ | 100% |
| Products | | |
| Gold in solution: | $2.1901 \times 2.7 = 6 \text{ mg}$ | 85.71% |
| Gold in the residue: | $188 \text{ g} \times \frac{5.5}{10^6} = 1 \text{ mg}$ | 14.28% |
| Total: | $7 \text{ mg}$ | 99.99% |

The solution having a volume of 2.09 l and containing 1.36 g of silver/liter and 2.7 mg of gold/liter is brought to a temperature of 55° C. 300 mg of granulated aluminum are added thereto in two times. After one hour, the obtained precipitate is filtered. One recovers 2.180 l of filtrate containing 40 mg of Ag/l and <1 mg of gold/l. The precipitate weighs 3.144 g and contains 89.9% of silver, 1.750 g of gold/ton and 0.20% of aluminum.

One may establish for the silver the following ballance:

| Starting material | | |
|---|---|---|
| Silver in solution: | $2.090 \text{ l} \times 1.36 = 2.842 \text{ g}$ | 100% |
| Products: | | |
| Silver in solution: | $2.180 \text{ l} \times 0.040 = 0.087 \text{ g}$ | 3.06% |
| Silver in the precipi- | | |

-continued

| | | | |
|---|---|---|---|
| tate: | 3.144 l × 0.899 = | 2.826 g | 99.43% |
| Total: | | 2.913 g | 102.49% |

For the gold the ballance is the following:

| Starting material | | | |
|---|---|---|---|
| Gold in solution: | 2.090 l × 2.7 = | 5.6mg | 100% |
| Products: | | | |
| Gold in solution: | 2.180 l × 1 mg/l = | <2.18mg | <38.92% |
| Gold in the precipitate: | $3.144 \times \frac{1750}{10^6}$ = | 5.5mg | 98.21% |
| Total: | | <7.68mg | <137.13% |

EXAMPLE 5

A flotation concentrate weighing 220.5 g and containing 1.44% of silver and 33g/ton of gold, identical to the one used in example 4, is dispersed in 1500 ml of water. Sulphuric acid is added so as to obtain a pH of 1.7. One further adds 30 g of thiourea as an aqueous solution containing 20 g of thiourea per liter.

The slurry is brought to a temperature of 70° C. 0.5 g of $H_2O_2$ are then added in fractions. After one hour, 100 ml of trichloroethylene are added and the mixture is brought to the boiling temperature which is 73° C. The mixture is left to react under reflux of the organic product for 2 hours. After 2 hours the solution contains 2.200 g of Ag/l. The trichloroethylene is then distilled off. After removal of the trichloroethylene, one adds to the slurry 110 mg of bone glue diluted in water. One filters then and one washes the filtrate with an aqueous solution of 20 g/l of thiourea.

The filtrate and the washing waters are collected and one obtains a volume of 2.195 l containing 1.41 g of Ag/l and 2.9 mg of gold/liter.

The final residue weighs 180 g and contains 210 g of Ag/ton and 3.8 g of gold/ton.

One may establish the following ballance for the silver:

| Starting material | | | |
|---|---|---|---|
| Starting silver: | $220.5 \times \frac{1.44}{100}$ = 3.17 g | | 100% |
| Products | | | |
| Silver in solution: | 2.195 l × 1.41 = 3.10 g | | 97.78% |
| Silver in the residue: | $180 \text{ g} \times \frac{210}{10^6}$ = 0.038 g | | 1.19% |
| Total: | | 3.138 g | 98.97% |

For the gold, the balance is the following:

| Starting material | | | |
|---|---|---|---|
| Starting gold: | $220.5 \times \frac{33}{10^6}$ = 7 mg | | 100% |
| Products | | | |
| Gold in solution: | 2.195 × 2.9 = 6.3 mg | | 90% |
| Gold in the residue: | $180 \text{ g} \times \frac{3.8}{10^6}$ = 0.7 mg | | 10% |
| Total: | | 7.0 mg | 100% |

The solution which has a volume of 2.095 l and which contains 1.41 g of Ag/l and 2.9mg of gold/l is brought to a temperature of 55° C. 300 mg of granulated aluminum are added thereto in two times. After one hour the obtained precipitate is filtered. One recovers 2.2 l of filtrate containing 38 mg of Ag/l and 1 mg of gold/l.

The precipitate weighs 3.245 g and contains 90.1% of Ag, 1700 g of gold/ton and 0.20% of aluminum.

One may establish for the silver the following ballance:

| Starting material | | |
|---|---|---|
| Silver in solution: | 2.0951 × 1.41 = 2.954 g Ag | 100% |
| Products | | |
| Silver in solution: | 2.2001 × 38mg Ag/l = 0.84 Ag | 2.84% |
| Silver in the precipitate: | $3.245g \times \frac{90.1}{100}$ = 2.924g Ag | 99% |
| Total: | 3.008g Ag | 101.84% |

The balance for the gold is the following:

| Starting material | | |
|---|---|---|
| Gold in solution: | 2.095 l × 2.9 = 6.075 mg | 100% |
| Products | | |
| Gold in solution: | 2.200 l × <1 mg Au/l <2.2 mg Au | 3.62% |
| Gold in the precipitate: | $3.245 \text{ g} \times \frac{1700}{10^6}$ | |
| | 5.5 mg Au | 90.53% |
| Total: | <7.7 mg Au | 124.74% |

EXAMPLE 6

11 g of silver cement resulting from the examples 1, 2, 3 and 4, containing 92.81% of silver and 1.530 g/ton of gold is remolten under a layer of borax at a temperature of 1050° C.

After cooling one obtains an ingot of silver and gold weighing 10.403 g, the analytical composition of which is the following:

| | Ag | 97.8% | |
|---|---|---|---|
| | Au | 1610 g/ton | |
| Bal: | | Ag | Au |
| Amounts of metals contained in the cements: | | 10.2091 g | 16.83 mg |
| Amounts of metals contained in the ingot | | 10.1741 g | 16.74 mg |
| Percentage of the recovered metals | | >99.66% | >99.5 % |

The ingots of gold containing silver may be refined by conventionnal processes such as by electrorefining.

What I claim is:

1. A process for recovering silver and, when present gold, from a silver and, if present, gold bearing solid starting material, in which said metal(s) are present in low proportions, a part thereof being in the form of free sulphides, said process comprising dispersing the starting material in an aqueous solution of thiourea and adding an oxidizing agent to the aqueous solution obtained, so as to solubilize the silver and gold, if present, in the form of complexes with the thiourea; and subjecting the obtained solution to a cementation by means of a metal so as to obtain a cement containing more than about 90% of silver.

2. A process according to claim 1, in which the cementation is performed by means of aluminium.

3. A process according to claim 1, in which the obtained suspension is acidified to a pH of about 1.5 to 2.5, the acid suspension is heated under constant stirring to a temperature between 60° C. and its boiling point, the obtained solution is filtered and the filtrate is subjected to a cementation by means of aluminium.

4. A process according to claim 1, in which thiourea is added as an aqueous solution of thiourea containing about 20 grams per liter of thiourea.

5. A process according to claim 1, in which the oxidizing agent is hydrogen peroxide.

6. A process according to claim 1, wherein before cementation the aqueous solution containing the silver and, if present, gold solubilized in the form of complexes with the thiourea, a flocculation agent is added to said solution and said solution is filtered.

7. A process according to claim 6, in which the flocculation agent comprises gelatin.

8. A process according to claim 1, in which gold is present.

9. A process for recovering silver and, when present, gold from a silver and, when present, gold bearing solid starting material, in which said metal(s) are present in low proportions, a part thereof being in the form of free sulphides and in admixture with elemental sulphur, said process comprising suspending the starting material in an aqueous solution of thiourea so as to solubilize the silver and gold, if present, in the form of complexes with the thiourea and adding to the aqueous suspension of starting material and thiourea an organic solvent for sulphur; and subjecting the obtained solution to a cementation by means of a metal so as to obtain a cement containing more than about 90% of silver.

10. A process according to claim 9, in which the organic solvent is selected from carbon sulphide and chlorinated olefins.

11. A process according to claim 9, in which the mixture of the organic solvent and the aqueous suspension of the starting material and thiourea is heated to boiling at reflux, after which the solvent is removed by distillation from a resulting aqeos phase or solution containing the silver and, if present, the gold, solubilized in the form of complexes with the thiourea.

12. A process according to claim 9, in which the cementation is performed by means of aluminium.

13. A process according to claim 9, in which the obtained suspension is acidified to a pH of about 1.5 to 2.5, the acid suspension is heated under constant stirring to a temperature between 60° C. and its boiling point, the obtained solution is filtered and the filtrate is subjected to a cementation by means of aluminium.

14. A process according to claim 9, in which thiourea is added as an aqueous solution of thiourea containing about 20 grams per liter of thiourea.

15. A process according to claim 9, in which gold is present.

* * * * *